DRIVE MEANS FOR A WHEELED VEHICLE

Original Filed Nov. 19, 1959 4 Sheets-Sheet 1

CHARLES W. WISE,
INVENTOR

FULWIDER, PATTON,
BY: RIEBER, LEE & UTECHT
ATTORNEYS

DRIVE MEANS FOR A WHEELED VEHICLE
Original Filed Nov. 19, 1959 4 Sheets-Sheet 2
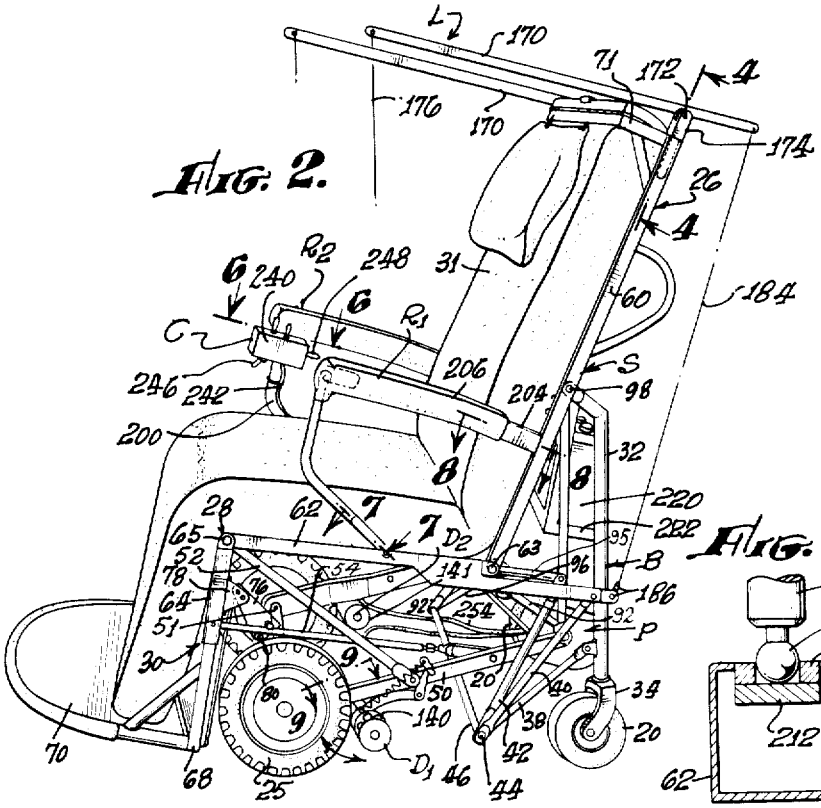
CHARLES W. WISE,
INVENTOR.
BY: FULWIDER, PATTON, RIEBER, LEE & UTECHT
ATTORNEYS.

DRIVE MEANS FOR A WHEELED VEHICLE
Original Filed Nov. 19, 1959 4 Sheets-Sheet 3
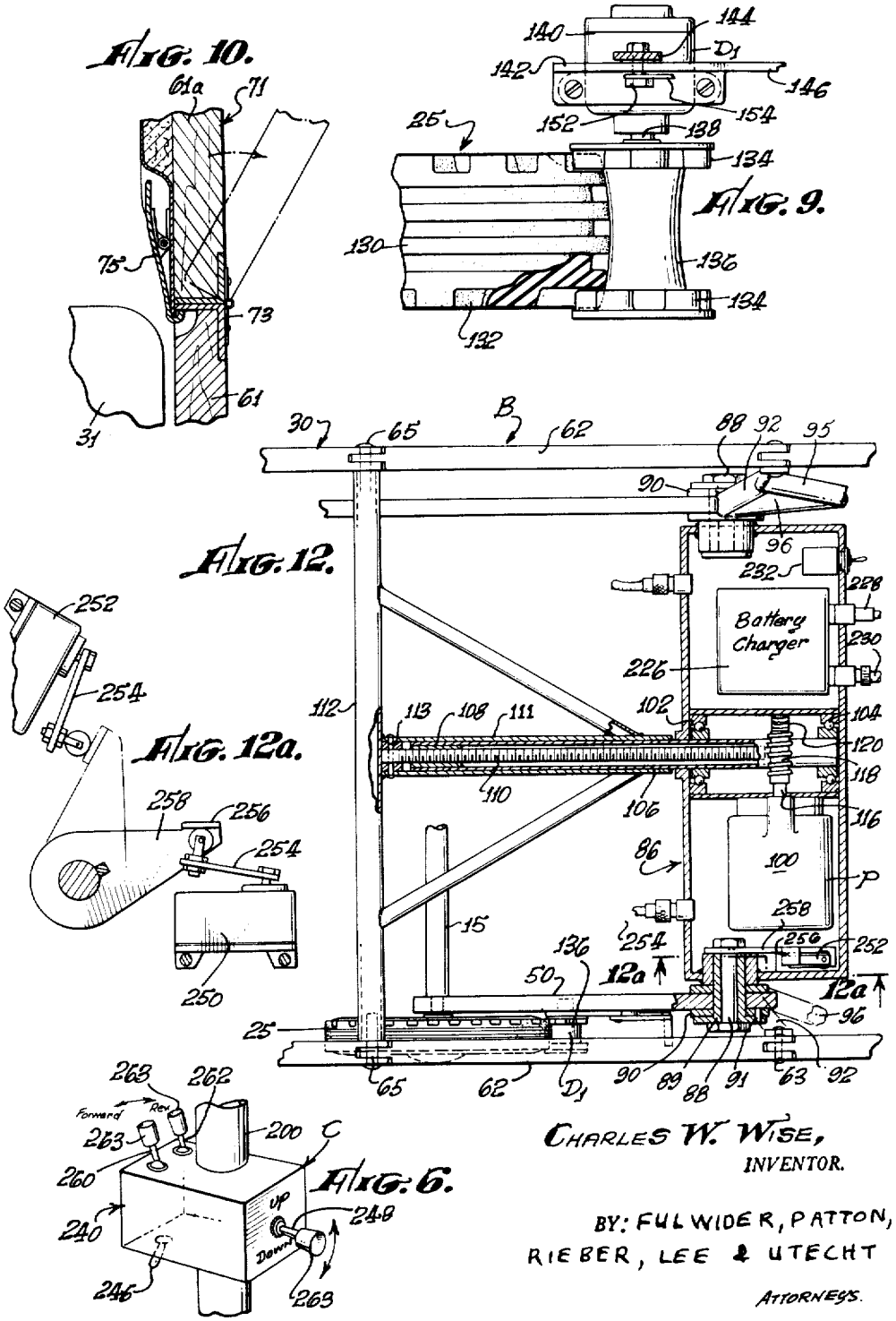
CHARLES W. WISE,
INVENTOR.
BY: FULWIDER, PATTON, RIEBER, LEE & UTECHT
ATTORNEYS.

DRIVE MEANS FOR A WHEELED VEHICLE

Original Filed Nov. 19, 1959 4 Sheets-Sheet 4

CHARLES W. WISE,
INVENTOR

FULWIDER, PATTON,
BY: RIEBER, LEE & UTECHT
ATTORNEYS

United States Patent Office

Re. 26,044
Reissued June 28, 1966

26,044

DRIVE MEANS FOR A WHEELED VEHICLE

Charles W. Wise, 511 Eastwood Ave., Santa Ana, Calif.

Original No. 3,112,001, dated Nov. 26, 1963, Ser. No. 221,220, Sept. 4, 1962, which is a division of Ser. No. 854,152, Nov. 19, 1959, now Patent No. 3,094,713, dated June 25, 1963. Application for reissue Oct. 12, 1965, Ser. No. 497,601

4 Claims. (Cl. 180—74)

Matter enclosed in heavy brackets [ ] appears in the original patent but forms no part of this reissue specification; matter printed in italics indicates the additions made by reissue.

This is a division of my application Serial No. 854,152, filed November 19, 1959, now Patent No. 3,094,713.

The present invention relates generally to *a drive means for a wheeled vehicle* [an invalid's bed] and more particularly to *a drive means for* an invalid's bed which is adapted to support a patient in various reclining positions between a supine and a sitting position.

The difficulties involved in handling partially or completely paralyzed bed-ridden patients, especially patients having a heavy body structure, are well known. With existing invalid handling equipment it is generally necessary to employ several nurses in order to attend to the invalid's needs.

It is a major object of the present invention to provide a foldable invalid's bed which permits a single nurse to readily manipulate an invalid so as to attend to his every need.

It is another object of the invention to provide a foldable invalid's bed which is capable of supporting an invalid in various reclining positions and is power-driven between such positions. Although various forms of invalid beds have been heretofore-proposed which have been capable of supporting a patient in various reclining positions, such beds must generally be manipulated between positions by a nurse rather than the patient himself. Thus, where a nurse is not constantly in attendance, the invalid must wait until the nurse becomes available.

A further object is to provide a power-driven invalid's bed of the aforedescribed nature which may be controlled by the invalid himself.

Yet a further object is to provide a foldable invalid's bed incorporating an integral patient lift adapted to automatically raise the invalid off the bed's mattress as the parts of the bed are removed from a position to support the patient in a supine condition to a position wherein he will be supported in a seated condition. With the patient raised free of the mattress the linen may be readily changed. Additionally, a portable commode may be inserted and removed from underneath the patient.

Another object is to provide an invalid's bed of the aforedescribed nature which is provided with completely self-contained driving means controllable by the patient thereby permitting the patient complete freedom of movement from place to place.

Another object is to provide an invalid's bed of the aforedescribed nature having a foot rest that is automatically retracted to clear the floor as the bed is moved from a bed-defining position to a chair defining position whereby a bed of maximum length for a given height is provided.

Yet another object is to provide a unique driving arrangement for the traction wheels of *a wheeled vehicle such as* a power-driven patient-operated bed.

A still further object is to provide an invalid's bed having a novel removable arm rest and guard rail arrangement.

It is yet a further object of this invention to provide an invalid's bed of the aforedescribed nature which is simple in design and rugged of construction.

An additional object is to provide an invalid's bed which is compact in size and comparatively light in weight whereby it may be easily moved from one location to another. Thus, the invalid may join others in various activities such as dining, watching television, etc.

A particular object of the invention is to provide a foldable invalid's bed which is usable as a conventional wheel chair when arranged in its chair-defining position. When so arranged, the invalid may maneuver the device exactly as he would a conventional wheel chair.

These and other objects and advantages of the present invention will become apparent from the following detailed description, when taken in conjunction with the appended drawings, wherein:

FIGURE 2 is a perspective view showing said bed arranged in a chair-defining position to support the invalid in a seated condition;

FIGURE 6 is a perspective view generally on line 6—6 of FIGURE 2;

FIGURE 7 is a vertical sectional view in enlarged scale taken on line 7—7 of FIGURE 2;

FIGURE 8 is a sectional view in enlarged scale taken on line 8—8 of FIGURE 2;

FIGURE 9 is a perspective view in enlarged scale taken on line 9—9 of FIGURE 2;

FIGURE 10 is a fragmentary vertical sectional view showing a headrest member of said bed;

FIGURE 11 is a side elevational view showing the parts of said bed arranged in an unloading position and equipped with a sling for lifting the invalid from the bed;

FIGURE 12 is a sectional view in enlarged scale taken on line 12—12 of FIGURE 1;

FIGURE 12a is a fragmentary side view showing an electric limit switch arrangement utilized with said bed;

GENERAL ARRANGEMENT

Figure 1:
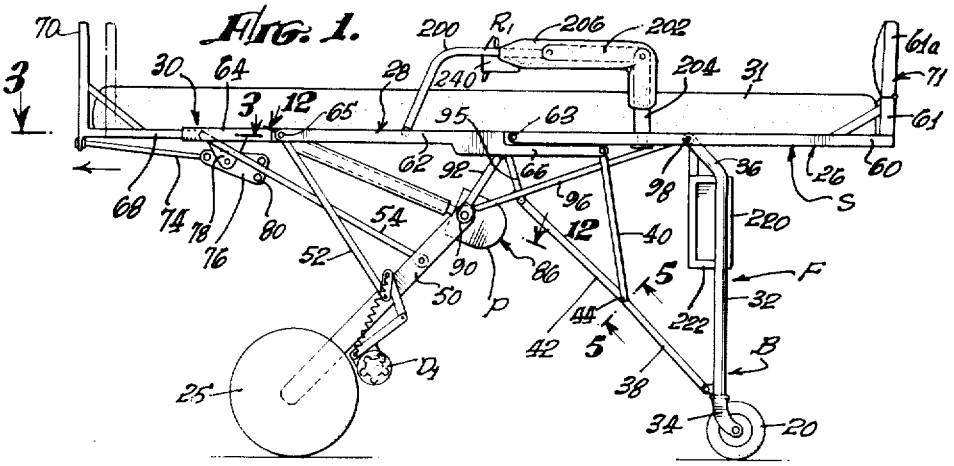
FIGURE 1 is a side elevational view of a preferred form of invalid bed embodying the present invention, said bed being arranged in a bed-defining position to support the invalid in a supine condition.

Referring to the drawings and particularly FIGURE 1 thereof, the preferred form of invalid bed embodying the present invention includes a base member B and a foldable body-supporting member S. The base member B is formed with a rear ground-engaging means, such as a pair of rear wheels 20. The base member B includes a fixed portion and a longitudinally movable portion. The longitudinally movable portion is provided with front ground-engaging means, such as a pair of front or traction wheels 25. The body-supporting member S includes a back portion 26, a buttock portion 28 and a leg portion 30. The front and rear ends of the buttock portion 28 are respectively pivotally interconnected to the rear end of the leg portion 30 and the front end of the back portion 26. Power-operated means P are interposed between the base member B and the body-supporting member S. Additional power-operated means D1 and D2 are provided on the base B for engagement with the front or traction wheels 25. The power-operated means P and D1, D2 are adapted to be controlled by the invalid. Control means C for these power-operated means are provided within easy reach of an invalid resting upon the mattress 31 of the body-supporting member S. The power-operated means P is adapted to move the body-supporting member S from a bed-defining position of FIGURE 1 wherein it will support an invalid in a supine condition to a chair-defining position of FIGURE 2 wherein it will support the invalid in a seated condition and to an unloading position shown in FIGURE 11. The invalid bed embodying the present invention also incorporates a patient lift L, shown particularly in FIGURE 11. This patient lift L is adapted to lift the invalid off the mattress 31 of the body-supporting member S when the bed is in its unloading position.

THE BASE MEMBER B

Figure 5:
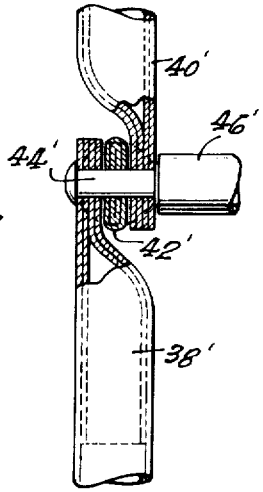
FIGURE 5 is a fragmentary sectional view in enlarged scale taken on line 5—5 of FIGURE 1, but showing a modified form of link connection.
Figure 13:
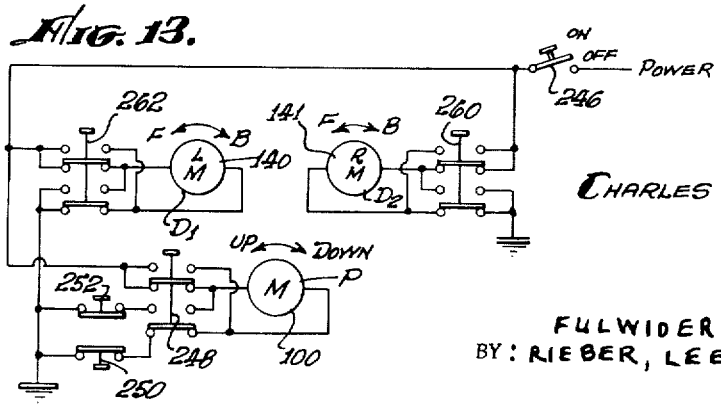
FIGURE 13 is an electrical circuit utilized with said bed.

More particularly, the fixed portion of base member B includes a pair of parallel, vertically extending columns 32. The lower ends of these columns 32 are pivotally attached to the casters 34 of the aforementioned rear wheels 20. The integral upper portion of these side elements 32 extend generally forwardly as indicated at 36. The lower portions of these side elements 32 are pivotally connected to the rear ends of a first pair of link elements 38. The front ends of each of these link elements 38 are pivotally secured to a second pair of link elements 40 and a third pair of link elements 42. As indicated in FIGURE 2, the link elements 38, 40 and 42 on each side of the base B are pivotally interconnected by means of pivot pins 44 that are integrally formed at opposite ends of a horizontally extending crossbrace 46. Preferably, the side elements 32 and the links 38, 40 and 42 are of tubular metallic construction. The upper ends of the links 40 and 42 are pivotally connected to the body-supporting member S in a manner to be hereinafter described. In FIGURE 5 there is shown a modified form of link connection wherein like parts bear primed reference numerals.

The base B also includes a pair of parallel, elongated struts 50, the lower ends of which rotatably support a transverse axle 51 for the traction wheels 25. The intermediate portions of the struts 50 are pivotally connected to a first pair of links 52 and a second pair of links 54. The opposite ends of the links 52 and 54 are pivotally connected to the body-supporting member S in a manner to be described hereinafter. The struts 50 also support the aforementioned driving means D1 and D2 for the traction wheels 25.

THE BODY-SUPPORTING MEMBER S

The body-supporting member S includes three longitudinally aligned pairs of rail elements, designated 60, 62 and 64 which define the sides of the back 26, buttock 28 and leg 30 portions, respectively. The front ends of the back rail elements 60 are pivotally connected to the intermediate portion of the buttock rail elements 62 by pins 63. The buttock rail elements 62 each includes a horizontal extension 66 disposed at a lower elevation than and underlying the front portion of the back rail elements 60. The front ends of the buttock rail elements 62 are pivotally connected to the rear ends of the leg rails 64 by pins 65. Conventional mattress supporting springs 67 extend between the aforedescribed rail elements, as indicated in FIGURE 3.

Figure 3:
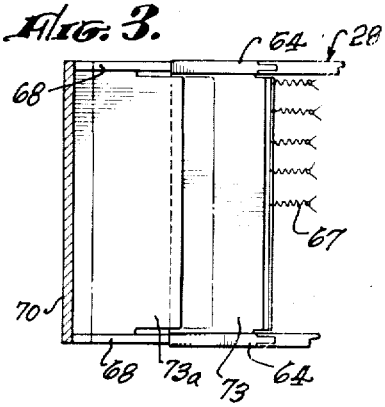
FIGURE 3 is a fragmentary horizontal sectional view taken on line 3—3 of FIGURE 1.

As indicated in FIGURES 1 and 3, the front portion of the leg portion 30 is longitudinally extendable relative to the front portion of leg rails 64. Thus, the front portions of the rails are of open-ended tubular construction so as to telescopically slidably receive extensions 68. The front ends of these extensions 68 extend upwardly, relative to FIGURE 1, so as to support a foot rest 70. A headboard, generally designated 71, is supported at the rear end of the back rails 60 in a manner to be fully described hereinafter. The foot rest 70 is longitudinally movable between its solid and dotted outline positions of FIGURE 1 by means of a tension rod 74. The front end of this tension rod 74 is affixed to the underside of the foot rest 70. The rear end of the tension rod 74 is affixed to a bell crank plate 76. The intermediate portion of this plate is pivotally connected to a lug 78 that depends from the underside of one side of the front portions of the leg rails 64. The rear portion of the bell crank plate 76 is formed with a pair of actuating pins 80. These actuating pins are disposed on either side of one of the aforementioned links 54 and are butted by said link during movement of the bed from its position of FIGURE 1 to its position of FIGURE 2 so as to effect automatic retraction of the foot rest 70 relative to the body-supporting member S in a manner to be more fully described hereinafter. Preferably, the leg rails 64 are interconnected by sliding panels 73 and 73a rather than springs 67, the panel 73a extending between extensions 68, as shown in FIGURE 3.

The aforementioned power-operated means P is disposed in a transversely extending power housing, generally designated 86. As indicated in FIGURE 12, the opposite ends of the power housing 86 carry pivot bolts 88 that rotatably extend through bushings 89. The latter each extends through a pair of aligned bores formed in bifurcations 90. The bifurcations 90 are locked to bushings 89 by pins 91. The upper portion of each of these bifurcations is rigidly affixed as by welding to a short link 92, the upper end of which is connected to the pivot pin 63 that interconnects the front ends of the back rails 60 with the intermediate portions of the buttock rails 62, as indicated in FIGURE 1. The bushings 89 rotatably extend through the upper ends of the aforementioned struts 50. The bifurcations 90 are also each rigidly affixed to an actuating link 96, the rear end of which is connected to the pivot pin 98 that secures the upper ends of the columns 32 to the intermediate portion of the back rails 60. A rigid link 95 has its opposite ends rigidly affixed as by welding to the upper end of link 92 and the intermediate portion of link 96 to retain links 92 and 96 against relative movement. In the interest of clarity the links 92 and 96 are shown in plan view at the upper portion of FIGURE 12 from a point slightly above the line 12—12 of FIGURE 1. The lower portion of FIGURE 12, however, shows these elements as seen from line 12—12 of FIGURE 1. The upper end of each link 92 is pivotally connected to the intermediate portion of link 96.

Referring to FIGURE 10, the rear ends of the back rails 60 are connected with the lower portion 61 of the headboard 71. The upper end of the latter is pivotally connected to the upper portion 61a of the headboard 71 by a hinge plate unit 73. This permits the portion 61a to be folded rearwardly from its solid outline position of FIGURE 10 to its folded position of FIGURES 2 and 11. A suitable latch 75 is interposed between the headboard portions 61 and 61a.

THE POWER-OPERATED MEANS P

Referring now particularly to FIGURE 12, the power-operated means P includes a conventional electric motor 100 that is disposed within one side of the aforementioned power housing 86. The midportion of the housing 86 supports a pair of longitudinally aligned bearings 102 and 104 which rotatably support the rear end of a longitudinally extending drive tube 106. The front portion of the drive tube 106 carries an internally threaded drive nut 108. A rearwardly extending pusher member such as a drive screw 110 extends into this nut 108. This drive screw 110 is encompassed by a tubular grease shield 111 having its front end welded to a cross-piece 112. The front end of the drive screw 110 is rigidly affixed to the front end of the grease shield by a pin 113. The outermost ends of the cross-piece receive the pins 65 that pivotally interconnect the front ends of the buttock rails 62 and the rear ends of the leg rails 64.

The shaft 116 of the electric motor 100 is rigidly affixed to a worm gear 118. The teeth of this worm gear 118 mesh with a pinion 120 formed on the portion of the drive tube 106 between the aforementioned bearings 102 and 104. With this arrangement, rotation of the motor 100 will effect concurrent rotation of the drive tube 106 and hence the nut 108. Such rotation of the nut 108 will in turn effect concurrent longitudinal movement of the power housing 86 relative to cross-piece 112. The motor 100, gear 118, pinion 120, drive tube 106 and nut 108 thus act as a drive means for actuating the pusher member or drive screw 110.

THE DRIVE MEANS D1 AND D2

Figure 17:
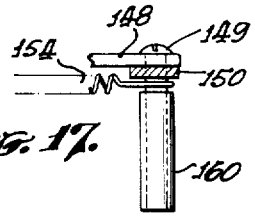
FIGURE 17 is a fragmentary sectional view taken on line 17—17 of FIGURE 14.
Figure 16:
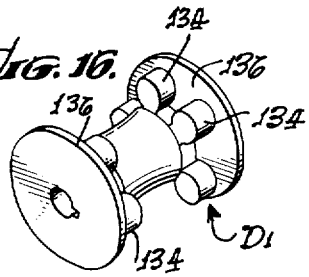
FIGURE 16 is a perspective view of an element of said clutch mechanism.

The drive means D1 and D2 are mirror images of one another and are employed respectively with the front or traction wheels 25. As indicated particularly in FIGURES 9 and 14, the sides of the periphery of the rubber tires 130 of the traction wheels 25 are formed with radially inwardly extending grooves 132. These grooves 132 are adapted to receive complementary cogs 134 formed on the sides of the drive spools 136. The drive spools 136 are keyed to the shafts 138 of electric motors 140 and 141 forming a part of the drive means D1 and D2. If desired, the drive [spools 136] *cogs 134* could take the form of rotatable rollers formed of Teflon or the like. As indicated in FIGURE 9, each electric motor is supported by a depending bracket 142. The upper midportion of each bracket 142 is pivotally affixed to a lug 144 that depends from the intermediate portion of one of the struts 50 just rearwardly of a point of the strut aligned with the periphery of its respective tire. The upper portion of each bracket 142 is formed with an integral rearwardly extending arm 146. The rear end of such arm 146 is pivotally connected by a pin 147 to the front end of a toggle arm 148. The rear portion of such toggle arm 148 is pivotally connected by a pin 149 to the free end of a short toggle crank 150. The upper end of each crank 150 is pivotally connected to its respective strut 50 at a point 156 rearwardly of its respective lug 144. The pivot pin 152 which pivotally interconnects the lug 144 to the upper portion of its respective bracket 142 extends sidewardly so as to receive the front end of a conventional coil toggle spring 154 (FIG. 17). The rear end of this spring 154 is received by a sideward extension of the pivot pin 149 interconnecting the rear end of the toggle arm 148 and the free end of the toggle crank 150. As indicated in FIGURE 14, the pivot pin 156 that connects the toggle crank 150 to strut 50 also connects the lower end of link 52 to such strut.

Figure 14:
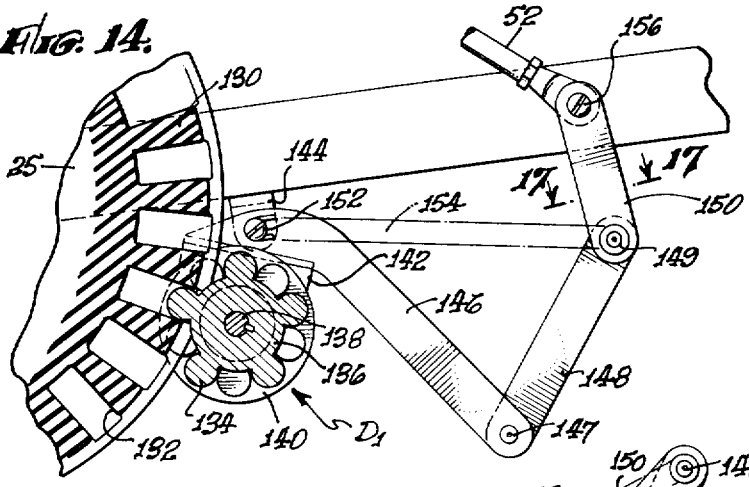
FIGURE 14 is a fragmentary vertical sectional view in enlarged scale showing a clutch mechanism utilized with said bed and arranged in a driving position.
Figure 15:
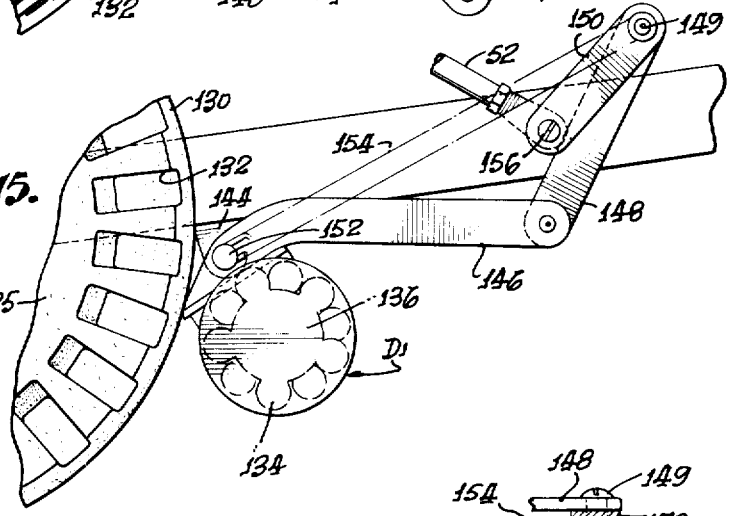
FIGURE 15 is a view similar to FIGURE 14 but showing said clutch mechanism disengaged.

With this arrangement, either spool 136 may be moved forwardly to its position of FIGURE 14 when it is desired to effect rotation of the traction wheels 25. At this time the cogs 134 of the spools will engage with the grooves 132 of the tires 130. The spools will be maintained in engagement with the tires 130 by virtue of the tension applied to the free end of the toggle arm 148 by the spring 154. When it is desired to disengage the spools 136 from the tires 130, it is merely necessary to effect counterclockwise movement of the toggle crank 150 to its position of FIGURE 15. This may be readily accomplished by means of a sidewardly extending control handle 160 which is supported by the pivot pin 149, as shown in FIGURE 17. With the toggle crank 150 arranged in its over-center position of FIGURE 15 the spring 154 will maintain the crank in this position once the axis of the pivot pin 149 has been moved over a straight line extending between the axis of the pivot pin 152 and the axis of the pivot pin 156. With this arrangement, the tires 130 can be worn down as much as one-third and yet the cogs 134 will properly mesh with grooves 132.

THE PATIENT LIFT L

Figure 4:
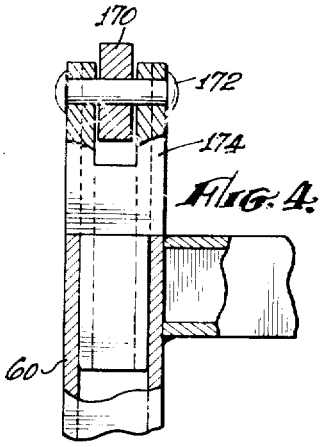
FIGURE 4 is a fragmentary sectional view in enlarged scale taken on line 4—4 of FIGURE 2.

The patient lift L is preferably removably affixed to the invalid's bed of the present construction. This patient lift L includes a pair of rigid arms 170. The intermediate portion of each of these arms is pivotally connected by a pivot pin 172 to a mounting bracket 174. Each mounting bracket 174 is adapted to be removably telescopically disposed within the rear ends of the aforedescribed back rails 60, as shown in FIGURES 2 and 4. The front ends of the arms 170 are each affixed to a depending flexible element, such as a cable or chain 176. The cables 176 have their opposite ends secured to the sides of a sling 178 that conform to and receives the buttocks of a patient disposed upon the mattress 31. Preferably, the sling 178 will be formed with an aperture 180 whereby it may be employed with a portable commode (not shown). The intermediate portions of the chain 176 are affixed to the sides of a back-rest auxiliary sling 182. The rear ends of the arms 170 are affixed to the upper ends of a second pair of flexible elements or cables 184. The lower ends of these cables 184 are affixed to a suitable mounting bracket 186 which is telescopically removably disposed within the rear ends of the buttock rails 62. With particular reference to FIGURE 11, the length of the cables 176 and 184 should be such that with the bed disposed in its unloading position the sling 178 will be supported above the buttock portion 28 of the mattress 31.

THE GUARD RAILS G

Referring to FIGURES 1 and 2, it should be noted that the body-supporting member S incorporates a pair of jointed guard rails R1 and R2. Each guard rail has its front end pivotally removably connected to the intermediate portion of the rail elements 62 of the buttock portion 28 and its rear end removably affixed to the intermediate portion of the rails 60 of the back portion 26. Each guard rail consists of an angular front element 200 having its rear end pivotally affixed to a straight intermediate element 202 and a straight rear element 204 pivotally connected to the rear end of the intermediate element 202. Preferably, suitable padding 206 will cover all of the intermediate element 202 and a portion of the front and rear elements 202 and 204.

Referring now to FIGURE 7, the front end of the front element 200 is integrally formed with a steel ball 208. This ball is shown removably disposed within a brass washer 210 that is rigidly affixed to the rail 62. A permanent magnet 212 is secured to the underside of the brass washer 210. With this arrangement, when the steel ball 208 is disposed within the confines of the washer 210 the permanent magnet 212 will restrain the inadvertent withdrawal of the ball therefrom. This affords a pivotable connection between the front element 200 of the guard rails R1 and R2 and the rails 62. Referring now to FIGURE 8, the rear end of the rear element 204 of each guard rail extends through aligned openings 214 and 216 formed in the back rail 60. A permanent magnet 218 is supported by the underside of each back rail 60 in vertical alignment with the openings 214 and 216. Since the guard rail element 204 is of steel construction once its rear end has been disposed within the openings 214 and 216, the permanent magnet 218 will serve to restrain inadvertent withdrawal of the element 204 from the openings 214 and 216.

Referring now particularly to FIGURE 2, it will be observed that the elements of the aforedescribed guard rails R1 and R2 pivot so as to provide a pair of arm rests when the bed is disposed in its chair-defining position of this figure. When it is desired to provide ready access to the mattress 31, the guard rails R1 and R2 may be readily removed. In this manner, changing the bedding may be more easily accomplished than if the guard rails were permanently affixed to the body-supporting member S. Also, the patient may more readily enter and leave the bed.

THE CONTROL MEANS C

Electric current for the electric motors 100, 140 and 141 of the power-operated means P and the power-operated means D1 and D2, respectively, is provided by means of a conventional electric storage battery 220 carried within a suitable bracket 222. The upper end of the bracket 222 is pivotally affixed to the intermediate portion of the back-supporting portion 26. Referring to FIGURE 12, a conventional battery charger 226 is mounted within the power housing 86 opposite the electric motor 100. The battery charger 226 may be connected to domestic house current by suitable conduit means 228 and to the battery 220 by conduit means 230. With continued reference to FIGURE 12, a master switch and circuit breaker 232 will preferably be mounted within the power housing 86. The provision of this device will permit a nurse to prevent an invalid from operating a bed against orders. The master switch and circuit breaker 232 will be connected to the battery 220 by suitable conventional wiring (not shown).

With the master switch and circuit breaker 232 in an "on" position, a patient disposed upon the bead may effect control over the power-operated means P, D1 and D2 by the control means C, such means including a switch box 240 which is mounted upon the front element 200 of the guard rail R2, as clearly shown in FIGURE 2. The switch box 240 is connected by suitable wiring 242 to the electric motors 100, 140 and 141. The control box 240 includes a number of conventional electric switches. Switch 246 extends from the underside of the switch box 240. This switch 246 serves as a patient-operated master switch and when moved to an "off" position cuts off all flow of electric current from the battery 220 to the electric motors 100, 140, 141. A second switch 248 extends from the rear of the switch box 240. This switch 248 controls the flow of electric current to the electric motor 100 of the power-operated means P that effect movement of the bed between its bed-defining position of FIGURE 1 and its unloading position of FIGURE 11.

Referring now particularly to FIGURES 12 and 12a, the switch 248 operates in conjunction with upper and lower limit switches 250 and 252 secured within the power housing 86 just outwardly of the electric motor 100. These limit switches 250 and 252 are of conventional microswitch type construction and include an actuator leaf 254 which when depressed serves to cut off the flow of electric current to the motor 100. The actuating leaves 254 of the limit switches 250 and 252 are adapted to be engaged by a finger 256 formed at the free end of an actuator arm 258. The opposite end of the actuator arm 258 is supported by the pivot bolt 88 and is locked against rotation relative to the bushing 89 in a suitable manner. The mode of operation of the limit switches will be described fully hereinafter. A pair of electric switches 260 and 262 extend from the upper portion of the switch box 240 in side-by-side relationship. Referring to FIGURE 6, the left-hand switch 260 controls the operation of the electric motor 140 of the left-hand drive means D1. The other switch 262 controls the operation of the electric motor 141 of the right-hand drive means D2. These electric motors are connected to the battery 220 by suitable wiring 254.

Preferably, the switches 248, 260 and 262 are provided with thimbles 263 permitting a patient to effect movement of these switches by his fingertips. Switches 246, 248, 260 and 262 are preferably spring-biased to a neutral position.

OPERATION

Referring to FIGURE 1, the parts of the afore-described invalid bed are shown arranged in position to support an invalid in a bed-defining supine condition, the back portion 26, buttock portion 28 and leg portion 30 of the body-supporting member S being disposed in horizontal alignment. Generally, at this time the headboard 71 will be arranged with its upper portion 61a in an upstanding position. If the invalid desires to assume a partially reclining position, he will move the switch 248 on the switch box 240 to the left relative to FIGURE 6 so as to cause the electric motor 100 to rotate. Referring now to FIGURE 12, such rotation of the electric motor 100 will cause the drive screw 110 to urge the power housing 86 downwardly and rearwardly relative to its position of FIGURE 1. Such movement will cause the struts 50 to be pivoted downwardly and rearwardly towards their positions of FIGURE 2. The cross-piece 112 will likewise be moved downwardly and rearwardly from its position of FIGURE 1 towards its position of FIGURE 2. In this manner the back, buttock and leg portions of the body-supporting member S will undergo a folding movement towards their positions of FIGURE 2. When the body-supporting member S has assumed a desired partially reclining position, the patient may return the electric switch 248 to a central position so as to cut off further flow of electric current to the motor 100. The body-supporting member S will then remain locked in its partly folded position.

Assuming now that the patient wishes the bed to assume its unloading position of FIGURE 11 instead of a partially reclining position, he will maintain the electric switch 248 in its left-hand position. The electric motor 100 will then continue to run until the body-supporting member S has reached its position of FIGURE 11. As the latter reaches this position the finger 256 of the actuator arm 258 will engage the leaf 254 of the upper limit switch 250, so as to automatically cut off further flow of electric current to the motor 100. The body-supporting member S will then remain in its unloading position of FIGURE 11 until the electric switch 248 is again moved. Assuming the patient wishes the bed to resume its bed-defining position of FIGURE 1, he need only move the switch 248 to its right-hand position of FIGURE 6. The electric motor 100 will then rotate until the body-supporting member S is in its horizontal position. When it has reached this position the actuator leaf 254 of the limit switch 252 will be engaged by the finger 256 of the actuator arm 258 as indicated in FIGURE 12a so as to automatically shut off further flow of electric current to the motor 100. It will be apparent that the switch 248 may be operated by a nurse or other attendant rather than the patient.

Assuming now the patient wishes to have the bed driven from one location to another, he will first cause the spools 136 of the drive means D1 and D2 to be moved to their driving position of FIGURE 14. This is accomplished by means of the handle 160. With the drive spools disposed in this position the cogs 134 thereof will be engaged with the grooves 132 of the tires 130. Thereafter, movement of the switches 260 and 262 forwardly will cause the electric motors 140 and 141 to drive the front wheels 25 forwardly. If the patient wishes the bed to undergo rearward movement, he will move the switches 260 and 262 rearwardly. In order to effect turning of the bed in either direction it is only necessary to advance one switch and move the other rearwardly. In order to stop rotation of the electric motors 140 and 141 the switches 260 and 262 will be arranged in an upstanding position. With the switches in this position and the drive spools 136 engaged with the tires 130, the wheels 25 will be effectively braked against rotation. Thus, the bed will be securely locked against inadvertent movement should, for example, it be desired to remove the patient therefrom. When the bed is to be moved by an attendant, the drive spools 136 may be retracted to their position of FIGURE 15.

It should be particularly noted that as the body-supporting member S is folded from its bed-defining position of FIGURE 1 to its unloading position of FIGURE 11, the foot rest 70 will be retracted from its solid outline position of FIGURE 1 to its dotted outline position therein. Such movement will be permitted by the longitudinal shortening of the mattress 31 which takes place as the latter is folded. The foot piece 70 undergoes such retraction under the influence of the tension rod 74, the bell crank 76 undergoing clockwise rotation under the influence of the link 54 as will be apparent by a comparison of FIGURES 1 and 11. This retraction of the foot rest 70 insures that it will clear the floor when the bed is arranged in its unloading position of FIGURE 11 whereby the foot rest will be disposed at floor level for the unloading of a patient. This construction permits the bed to have a maximum length for a given height.

It should additionally be noted that the wheel base and the various linkages of the aforedescribed bed do not extend beyond the width of the body-supporting member S, as will be apparent from FIGURE 12. Accordingly, the mattress 31 can be made wide enough to comfortably accommodate a patient and yet the bed can be readily manuevered through a standard size door.

Another important advantage of the aforedescribed construction is that the columns 32 will always be disposed in a generally vertically extending position when the bed is to be moved from one location to another. This permits the rear wheels 20 to caster freely.

Various modifications and changes may be made with respect to the foregoing detailed description without departing from the spirit of the invention or the scope of the following claims.

I claim:

1. In an invalid's bed, the combination of, a base member having a pair of traction wheels formed with resilient tires, the radially outer sides of said tires being formed with a plurality of circumferentially spaced, radially inwardly extending grooves with the intermediate portion of said tires being of greater diameter than said radially outer sides; a motor for each of said traction wheels, said motor driving a spool and said spools each being formed with cogs that are complementary to and consecutively insertable within said groves so as to effect rotation of said traction wheels; support means on said base member for each of said spools, said support means maintaining said spools in a driving position wherein they engage the peripheries of said tires or alternatively in a disengaged position spaced from said peripheries; and control means for said motors operable by an invalid when in said bed.

2. In an invalid's bed, the combination of, a base member having a pair of traction wheels formed with resilient tires, both radially outer sides of said tires being formed with a plurality of circumferentially spaced, radially inwardly extending grooves with the intermediate portion of said tires being of greater diameter than said radially outer sides; a motor for each of said traction wheels, said motor driving a spool and said spools each being formed on either side with cogs that are complementary to and consecutively insertable within said grooves so as to effect rotation of said traction wheels; support means on said base member for each of said spools, said support means maintaining said spools in a driving position wherein they engage the peripheries of said tires or alternatively in a disengaged position spaced from said peripheries, resilient means interposed between said support means and said base member normally biasing said spool towards said driving position; and control means for said motors operable by an invalid when in said bed.

3. A drive for an invalid's conveyance or the like, comprising: a pair of traction wheels formed with resilient tires, the radially outer sides of said tires being formed with a plurality of circumferentially spaced, radially inwardly extending grooves with the intermediate portion of said tires being of greater diameter than said radially outer sides; motor means for said traction wheels, said motor means driving a pair of spools and said spools each being formed with cogs that are complementary to and consecutively insertable within the grooves of one of said tires so as to effect rotation of said traction wheels; and means to maintain said spools in either a driving position wherein they engage the peripheries of said tires or alternatively in a disengaged position spaced from said peripheries.

*4. In a wheeled vehicle having a pair of traction wheels, each of which is provided with a resilient tire having its opposite, radially outer sides formed with a plurality of circumferentially spaced, radially inwardly extending grooves and further having the portion of said tire intermediate said outer sides of greater diameter than said outer sides, the combination of: drive means for said traction wheels including a pair of rotatable spools engageable with said traction wheels, respectively, each of said spools mounting a plurality of circumferentially arranged elements that are complementary to and consecutively insertable in said grooves of one of said tires to effect rotation of said traction wheels upon rotation of said spools; and means for maintaining said spools in engagement with said traction wheels for driving said traction wheels, and operative for moving said spools out of engagement with said traction wheels.*

References Cited by the Examiner

The following references, cited by the Examiner, are of record in the patented file of this patent or the original patent.

UNITED STATES PATENTS

| | | | |
|---|---|---|---|
| D. 60,723 | 3/1922 | Glidden et al. | 152—353 X |
| 680,891 | 8/1901 | Smith | 180—74 |
| 917,612 | 4/1909 | Kempshall | 152—353 X |
| 2,281,209 | 4/1942 | Smith | 296—20 X |
| 2,736,389 | 2/1956 | Pehlps | 180—74 X |
| 2,798,565 | 7/1957 | Rosenthal et al. | 180—74 X |
| 2,913,738 | 11/1959 | Wise | 296—20 |
| 3,064,744 | 11/1962 | Jennings | 180—6.6 |

FOREIGN PATENTS

| | | |
|---|---|---|
| 834,486 | 3/1952 | Germany. |

BENJAMIN HERSH, *Primary Examiner.*

E. E. PORTER, *Examiner.*

J. A. PEKAR, *Assistant Examiner.*